United States Patent [19]

Hamlin

[11] Patent Number: 4,936,154

[45] Date of Patent: Jun. 26, 1990

[54] SQUARED CIRCLE TRANSMISSION

[76] Inventor: Fred A. Hamlin, 345 S. New Hampshire St., Apt. 322, Los Angeles, Calif. 90020

[21] Appl. No.: 383,049

[22] Filed: Jul. 21, 1989

[51] Int. Cl.$^5$ .................. F16H 33/02; F16H 21/12
[52] U.S. Cl. ............................................. 74/67; 74/64; 74/417; 74/572
[58] Field of Search ................. 74/64, 67, 68, 572, 74/417

[56] References Cited

U.S. PATENT DOCUMENTS

| 229,875 | 7/1880 | Dixon | 74/67 |
| 746,323 | 12/1903 | Gaylord | 74/572 X |

FOREIGN PATENT DOCUMENTS

| 667490 | 11/1929 | France | 74/572 |
| 60-237260 | 11/1985 | Japan | 74/572 |
| 62-110046 | 5/1987 | Japan | 74/417 |
| 98149 | 3/1923 | Switzerland | 74/572 |
| 437487 | 10/1935 | United Kingdom | 74/64 |
| 824642 | 12/1959 | United Kingdom | 74/572 |

Primary Examiner—Allan D. Herrmann
Attorney, Agent, or Firm—Roger A. Marrs

[57] ABSTRACT

A transmission apparatus is disclosed herein for translating an input power force into an increased or multiple power output via power multiplier modules or units. Each module includes a pair of revolving discs lying on the same plane interconnected by a weighted link having its opposite ends pivotally coupled to each of the respective discs. The discs of each module lie in parallel and on the same turning axis as discs in the adjacent module. Discs from each module having common coaxial turning axes constitute a set and revolve in counter-rotational directions. The discs are driven by an input power source coupled to one set of discs from each module, while an output device is coupled to the other set of discs for receiving an imparted resistance force thereto. A flywheel operably couples with a selected set of discs via a clutch to provide a centrifugal additive resistance force to the output device.

5 Claims, 2 Drawing Sheets

SQUARED CIRCLE TRANSMISSION

BACKGROUND OF THE INVENTION

1. Field of the Invention

This invention relates to power translating mechanisms and more particularly to a novel mechanism for increasing the power derived from an input source via a series of multiplying modules or units.

2. Brief Description of the Prior Art

In the past, extensive and complex mechanisms have been provided for interconnecting a power source with a work load whereby the work load is more readily displaced, moved or actuated by means of an intermediate mechanical device which increases the power derived from the power source. For example, pulley and block arrangements serve as such an intermediate power multiplying device and gears of varying diameter arranged in gear trains represent other mechanical forms of power multiplication. In the latter instance, a power source is connected to one end of the gear chain via a drive shaft while the opposite end of the gear train is connected to the power load. In still other more conventional instances, gear transmissions and the like are employed for converting or translating power from a power source to a working load.

In other instances, such as disclosed in U.S. Pat. No. 4,186,614, complex mechanisms and linkage are employed for the transmission of power from a power source to a usable output. Most of such prior mechanisms are expensive to manufacture, difficult to maintain and adjust and require a degree of skill to assemble and operate at peak efficiency.

Although these devices have been successfully operated for their intended purposes, many of the devices are complex and are bulky so that they cannot be readily accommodated into modern day power and energy applications. In other instances, the weight-to-strength ratio is extremely high so that the device is not feasible for many applications.

Therefore, a long standing need has existed to provide a power multiplying apparatus which will readily translate or convert power from an input source to an output load which is increased or converted to a more powerful energy application and/or a substantial conservation of applied fuel or energy.

SUMMARY OF THE INVENTION

Accordingly, the above problems and difficulties are obviated by the present invention which provides a novel power multiplying apparatus for translating a power input into an increased power output via a plurality of serially arranged power multiplying modules. In accordance with the present invention, the squared circle transmission is provided having a pair of power translating modules employing at least two discs in each module rotatable on a common plane and interconnected by a power link means having a weight member carried thereon. The two discs of each module are arranged in parallel spaced-apart relationship with the two discs of the other module whereby their turning axes of adjacent discs are coaxial and in alignment. Such related adjacent discs from each module are referred to as a set of counter-rotating discs.

In one form, the power link means includes an elongated link having its opposite ends pivotally coupled to edge marginal regions of the two discs included in a module. The weight member is secured to the midsection of each link so as to contribute to the throw or centrifugal force experienced by the rotating discs.

An input power means is operably coupled to a first set of module discs for imparting a driving force thereto while an output means is operably coupled to the other set of counter-rotating discs. A centrifugal augmentation means, such as a flywheel, operably couples with the latter set of discs and a fluid clutch is coupled between the latter set of discs and the output device for applying an immediate full load thereto after power buildup through the modules.

Therefore, it is among the primary objects of the present invention to provide a novel power multiplier incorporating a novel weighted linkage mechanism incorporated into serially connected power modules for translating a power input to an increased power output.

Another object of the present invention is to provide a novel power multiplier whereby a plurality of mechanical module arrangements or mechanisms may be arranged in a serial manner to increase the power input at one end by achieving an increased power output at the other end.

Another object of the present invention is to provide a novel fuel or energy conversion device whereby power input is increased even though distance or displacement of the input device is the same as distance or displacement of the output means.

Still another object of the present invention is to provide a novel power conversion means incorporating a plurality of power multipler modules or units whereby input displacement and power is increased by power multiples but distance remains the same.

It is an object of the invention to provide a mechanism having trade-off ability to accelerate at load in exchange for fuel economy in excess of one-third and all at no trade-off in work by adapting axiomatic principles.

Still a further object is to provide a novel means for excess of one-third fuel (electricity or fossil) savings at no trade-off in "Force and distance equals work".

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
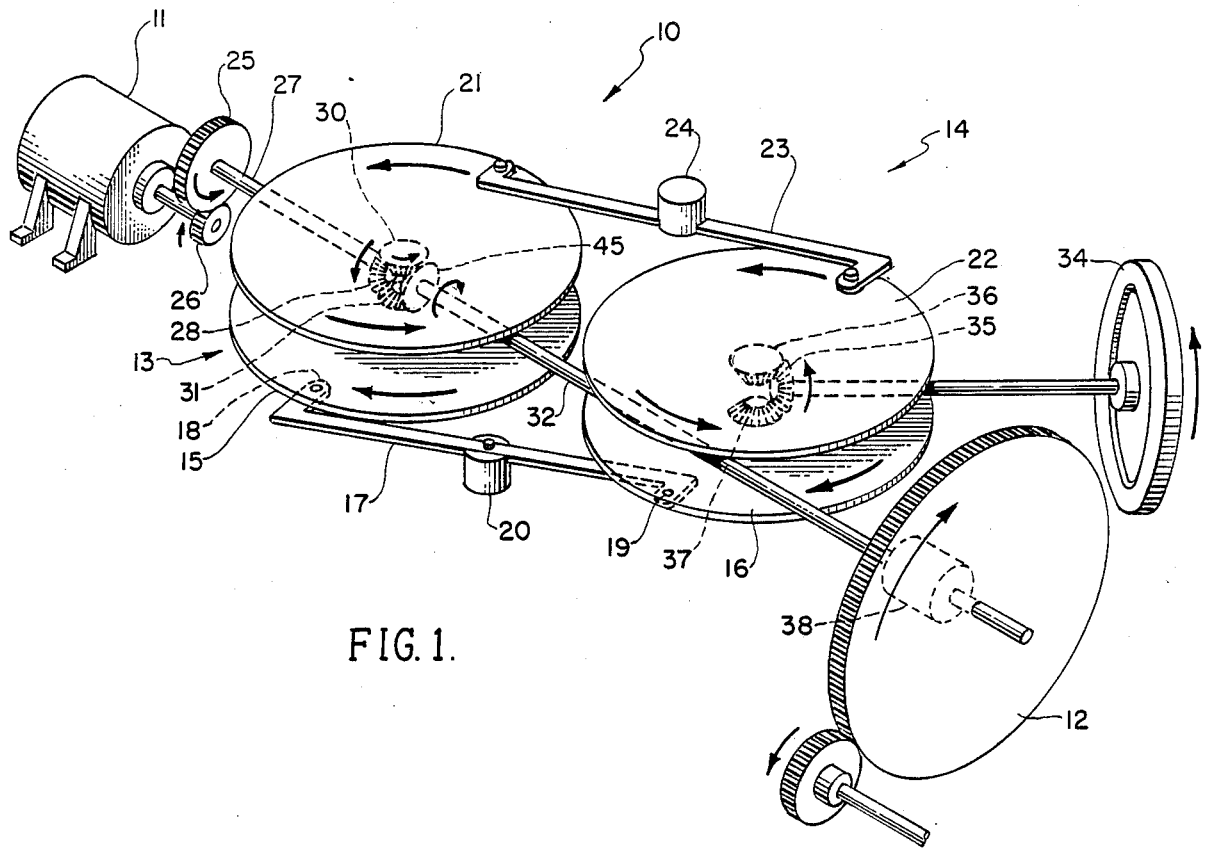
FIG. 1 is a perspective view of a diagrammatic illustration of the novel squared circle transmission power multiplying apparatus incorporating the present invention.

Referring to FIG. 1, a block schematic drawing of a power multiplying apparatus is illustrated where a device of a conventional design is represented by a power input characterized by numeral 10. The power input device may take the form of an electric motor, a hydraulic or pneumatic piston and assemblage or any other electro, electromechanical, mechanical or electrical device. Such a device may be operated from a conventional power source. However, it is to be understood that the present invention is not to be considered a power source since external power is required to operate the mechanism of the present invention, which functions as a power supply booster only.

Referring to FIG. 1, the novel power transmission of the present invention is illustrated in the general direction of arrow 10 which is operably connected to a power input 11 by any suitable means so that the apparatus will operate in accordance with the introduction of energy provided by the power input. Numeral 12 identifies a power output mechanism or means which is of an increased value over that provided by the power input 11. The difference in the power derived from the means 12 resides in the multiplication factor of the interconnecting power modules indicated by the numerals 13 and 14 respectively. The output power means 12 is coupled to the pair of modules by any suitable motion or movement translating device such as gears, pistons, conversion linkages or the like. It is emphasized that the output means 12 is not the subject matter of the present invention and that the present invention relates only to the power multiplier modules or units as a single apparatus or as used in a bank or slave units in multiple form.

In one form of the invention, a power drive and momentum module such as indicated by numeral 13 includes a clockwise rotating disc 15 and a counterclockwise rotating disc 21. Disc 15 is spaced from a rotating disc 16 which rotate in a clockwise direction in the same plane while disc 21 is spaced from a disc 22 coaxially related to disc 16. In the present illustration, the discs rotate in a horizontal plane and the edge marginal region of each disc 15 and 16 receives the opposite end of a link 17 having pivots 18 and 19 connected to the respective discs. Midway between the opposite ends of link 17, there is provided a weighted member 20 that is secured thereon and movable therewith as the discs 15 and 16 rotate.

It is to be observed that a second power driven module 14 comprises coaxial, rotating discs 16 and 22 and are arranged with substantially the same component parts. Disc 21 and disc 22 which rotate in a counterclockwise direction, have link 23 connecting the edge marginal regions of the respective discs by pivots. Weight member 24 is carried midway between the opposite ends of link 23 in the same manner as weight 20 with respect to link 17.

With respect to driving the module discs in their respective directions, power from motor 11 is provided to a drive gear 25 via a drive pinion 26. The drive gear 25 is connected to one end of a drive shaft 27 having a pinion gear 28 carried on its end in mesh with disc pinion gears 30 and 31 respectively. Therefore, as the drive shaft 27 is driven in the direction of the arrow adjacent pinion 28, the discs 21 and 15, comprising a drive set, will rotate via their respective drive pinions 30 and 31. Driving energy is also imparted to an intermediate drive shaft 32 which connects with the output means taking the form of a flywheel 12.

Power is additive to the rotation of discs 15 and 21 respectively by means of a set of discs taking the form of discs 16 and 22 forming a second or driven set and wherein each disc is a part of power module 13 or 14 respectively. In other words, discs 21 and 22, as well as discs 15 and 16, revolve in counter-rotation with respect to each other when the respective discs are viewed as being in sets. Disc 21 is coaxially disposed with respect to disc 15 in the first set and disc 22 is coaxially disposed with respect to the disc 16 in the second set. Both sets of discs operate about a common turning axis.

In order to provide additive power to the initial drive system, a flywheel 34 is provided that is rotated via its flywheel pinion 35 which is meshed with opposing pinion gears 36 and 37. Therefore, movement of discs 16 and 22 will cause the flywheel 34 to revolve accordingly and as the centrifugal force builds, such loading and forces will be carried over to the discs 15 and 21 respectively by means of the weighted links 17 and 23.

It is to be particularly noted that the intermediate power shaft 32 is coupled to the output means 12 by a fluid clutch 38 that is selectively operated by other automatic means. However, when the clutch is engaged at a time when the input power source 11 is supplying sufficient power to the discs for high speed rotation, the full load of generated resistance forces will be applied through the fluid clutch to the wheel for output means 12. It is not anticipated that a slow buildup will derive any benefits. The major beneficial increase in power occurs by a dramatic and instantaneous application of the accumulated resistance force or power in the power module directly to the output means through operation of the clutch 38.

Figure 2:
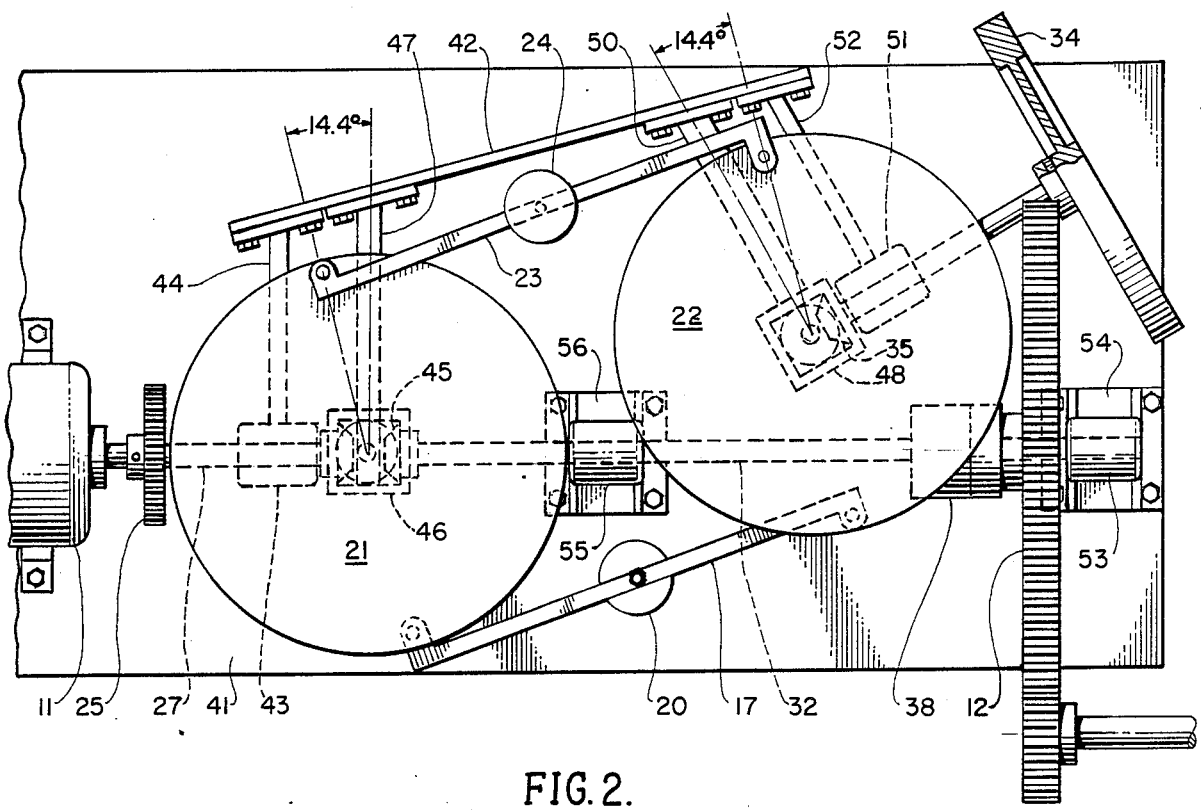
FIG. 2 is a plan view of the novel transmission or power multiplier employed in the system illustrated in FIG. 1.
Figure 3:
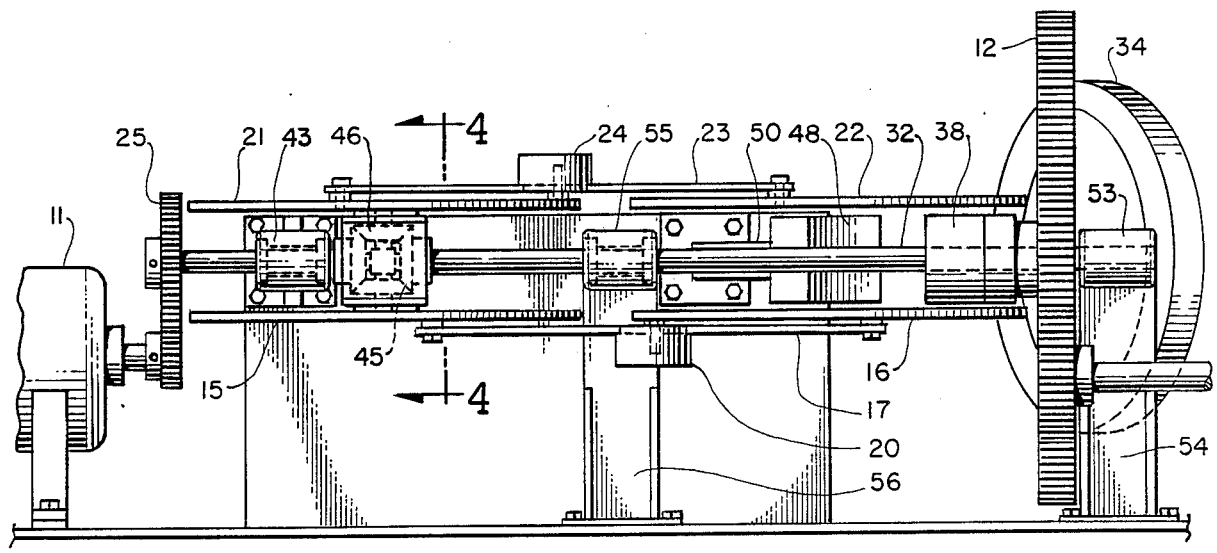
FIG. 3 is a side elevational view of the novel transmission or power multiplier shown in FIG. 2.

Referring now in detail to FIG. 2, it can be seen that the components of the system are mounted on a base plate 41 and from a vertically disposed plate 42. It can be seen that the main power shaft 27 is rotatably mounted within a journal bearing support 43 supported from the plate 42 by a cantilevered rod 44. The drive pinion gears 28, 30, 31 and intermediate pinion gear 45 are operably mounted in a gearbox 46 which is held on the end of a support member 47 from the plate 42. In a similar fashion, a pinion gearbox 48 is supported from the plate 42 by a support member 50 and a journal housing 51 is supported from plate 42 by support member 52. The intermediate drive shaft 32 is rotatably supported at one end in a journal bearing housing 53 carried on an upright stanchion 54, while the major length of the shaft is supported in a journal 55 on a stanchion support 56. This relationship is more clearly shown in FIG. 3.

Figure 4:
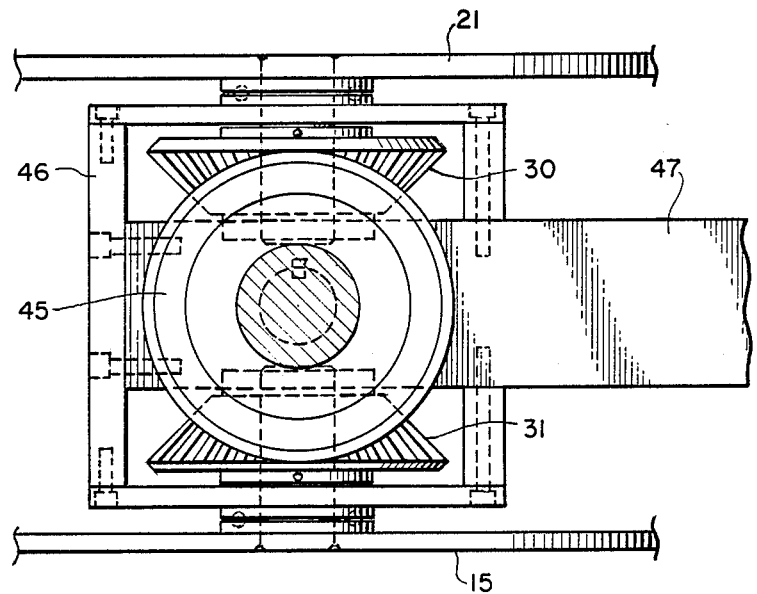
FIG. 4 is a transverse cross-sectional view of a set of counter-rotating discs from each power module interconnected by a driven input power means.

Referring now in detail to FIG. 4, an enlarged view is shown of a gearbox 46 showing that the pinions 28, 30, 31 and 45 are contained therein in a meshed configuration.

Therefore, it can be seen that the novel power transmission and multiplier of the present invention provides a unique construction for increasing and obtaining mechanical advantage from a power input 11 to the increased power output means 12. The modules 13 and 14 comprise substantially a pair of power handling means which increase the power via generation of energy by the flywheel 34 which is collected in the second set of discs 16 and 22 and added to the discs 15 and 21 respectively. The modules are arranged in a series relationship to collectively provide increased power to the output means 12. A source of power is introduced to one end of the power multiplying module for driving the module so that an output device, such as a rotating gear, sliding bars or the like, move a prescribed distance. By the law of work, it is well known that effort times effort equals distance, resistance times resistance distance, and therefore, the mechanical advantage can be determined by this measurement.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a power transmission apparatus for translating an input power force into an increased power output, the combinations comprising:
   a power augmentation unit having a drive and momentum module and a driven module;
   weighted links pivotally coupled between said modules;
   a centrifugal power generator operably coupled to said driven module for imparting a force thereto additive to said drive and momentum module;
   input power means connected in driving relationship to said drive and momentum module;
   output means for delivering augmented power by multiples of said driven module force; and
   clutch means selectively interconnecting said drive and momentum module with said output means.

2. The invention as defined in claim 1 wherein:
   said drive and momentum module and said driven module comprise:
   a pair of revolving discs arranged in a first set of coaxial discs and another pair of revolving discs arranged in a second set of coaxial discs;
   said weighted links coupling edge marginal region of respective discs from each set for transferring movement therebetween.

3. The invention as defined in claim 2 wherein:
   said power generator is a flywheel in driven relationship with said driven module.

4. The invention as defined in claim 3 including:
   pinion means interconnecting said discs of said first set with said power means for turning said discs in unison and in counter-rotation.

5. The invention as defined in claim 4 including:
   pinion means intercoupling said discs of said second set for revolving said discs in counter-rotation.

* * * * *